United States Patent
Tanaka et al.

(10) Patent No.: US 9,958,754 B2
(45) Date of Patent: May 1, 2018

(54) LENS APPARATUS AND IMAGE PICKUP APPARATUS INCLUDING THE SAME

(71) Applicant: CANON KABUSHIKI KAISHA, Tokyo (JP)

(72) Inventors: Yuhei Tanaka, Utsonomiya (JP); Gou Shibasaki, Utsonomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 14/678,130

(22) Filed: Apr. 3, 2015

(65) Prior Publication Data
US 2015/0286110 A1 Oct. 8, 2015

(30) Foreign Application Priority Data
Apr. 4, 2014 (JP) ................... 2014-078070

(51) Int. Cl.
*G03B 5/00* (2006.01)
*G03B 3/10* (2006.01)

(52) U.S. Cl.
CPC ............ *G03B 5/00* (2013.01); *G03B 3/10* (2013.01); *G03B 2205/0053* (2013.01)

(58) Field of Classification Search
CPC ..... G03B 5/00; G03B 3/10; G03B 2205/0053
See application file for complete search history.

(56) References Cited

U.S. PATENT DOCUMENTS

| | | | | |
|---|---|---|---|---|
| 3,940,777 A | * | 2/1976 | Komine | G03B 19/18 352/140 |
| 6,512,542 B1 | * | 1/2003 | Kaneko | G02B 7/102 348/240.3 |
| 6,526,232 B1 | * | 2/2003 | Mizumura | H04N 5/232 348/211.99 |

(Continued)

FOREIGN PATENT DOCUMENTS

| | | |
|---|---|---|
| JP | S50047439 U | 5/1975 |
| JP | 8-9207 A | 1/1996 |

(Continued)

OTHER PUBLICATIONS

Office Action issued in Japanese Appln. No. 2014078070 dated Jan. 9, 2018.

*Primary Examiner* — Jason A Flohre
(74) *Attorney, Agent, or Firm* — Rossi, Kimms & McDowell LLP (57) ABSTRACT

Provided is a lens apparatus, including: a lens barrel comprising an operation ring rotatable about an optical axis of an optical system to operate a movable optical member included in the optical system; and a driving apparatus engaging with the operation ring to drive the operation ring in a mounted state on the lens barrel, wherein the driving apparatus includes a first communication unit and an operation unit; the lens barrel includes a second communication unit; communication between the lens barrel and driving apparatus is established through the first and second communication units; in the mounted state, the first communi- (Continued)

cation unit is disposed on a surface covering a part of an outer peripheral surface of the lens barrel; and is located on a object side relative to an operation unit arranged closest to an image side in an optical axis direction of the optical system on the driving apparatus.

11 Claims, 7 Drawing Sheets

(56) References Cited

U.S. PATENT DOCUMENTS

| | | | | | |
|---|---|---|---|---|---|
| 7,808,547 | B2* | 10/2010 | Hirai | ............... | H04N 5/2254 348/345 |
| 7,962,028 | B2* | 6/2011 | Yamamoto | ............ | G02B 7/282 348/350 |
| 2001/0030813 | A1* | 10/2001 | Kaneko | ............... | H04N 5/23209 359/697 |
| 2002/0039242 | A1* | 4/2002 | Sasaki | ...................... | G02B 7/36 359/819 |
| 2003/0011692 | A1* | 1/2003 | Shore | .................... | H04N 5/2254 348/240.3 |
| 2005/0225660 | A1* | 10/2005 | Yoshikawa | ........ | H04N 5/23296 348/335 |
| 2006/0280491 | A1* | 12/2006 | Shibasaki | .......... | H04N 5/23212 396/121 |
| 2008/0024889 | A1* | 1/2008 | Idemura | ............... | H04N 5/2254 359/824 |
| 2011/0206359 | A1* | 8/2011 | Nishimura | ......... | H04N 5/23212 396/111 |

FOREIGN PATENT DOCUMENTS

| | | |
|---|---|---|
| JP | 2002090613 A | 3/2002 |
| JP | 2007310303 A | 11/2007 |

* cited by examiner

LENS APPARATUS AND IMAGE PICKUP APPARATUS INCLUDING THE SAME

BACKGROUND OF THE INVENTION

Field of the Invention

The present invention relates to a lens apparatus, and more particularly, to a lens apparatus which a driving apparatus configured to drive a lens is mountable to and dismountable from, and to an image pickup apparatus including the lens apparatus.

Description of the Related Art

In general, a driving apparatus is mounted to a lens configured to take moving images for professional use. The driving apparatus is capable of driving a variety of operation of the lens in order to smoothly take a shot at a fixed angle of view or with zooming at ultra-low speed, which is difficult to achieve by manual operation. However, in recent years, the lens has been used in various ways as in cinematography using the lens independently. Accordingly, there is an increasing demand for a lens driving apparatus having the structure usable in a dismountable manner as well as the structure usable in a state of being fixed to the lens. As the structure in which the driving apparatus is mountable to and dismountable from the lens, the following structure is disclosed.

For example, Japanese Patent Application Laid-Open No. H08-9207 discloses a lens apparatus including a drive unit serving as a driving apparatus capable of adjusting light intensity through operation of a zoom ring and an iris ring of the lens, and a mountable and dismountable drive unit capable of adjusting a focus through operation of a focus ring of the lens.

However, in view of a recent demand for downsizing of machinery, in order to transfer power supplied to the driving apparatus and outputs from various types of detecting systems associated with operation of the lens, it is necessary to establish direct communication between the lens and the driving apparatus as a way of providing communication between the lens and the driving apparatus. In the lens apparatus disclosed in Japanese Patent Application Laid-Open No. H08-9207, the mountable and dismountable driving apparatus cannot establish direct information communication to the lens, and power needs to be supplied from an outside of the lens apparatus. As a result, it is difficult to downsize the lens apparatus.

Figure 6A:
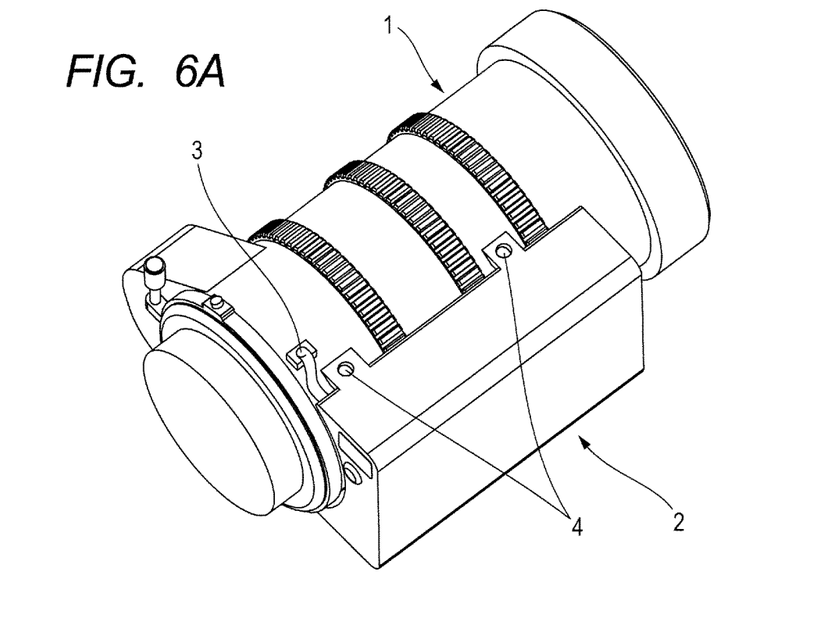
FIG. 6A is a perspective view illustrating the related-art structure establishing direct communication between a lens and a driving apparatus through a cable.
Figure 6B:
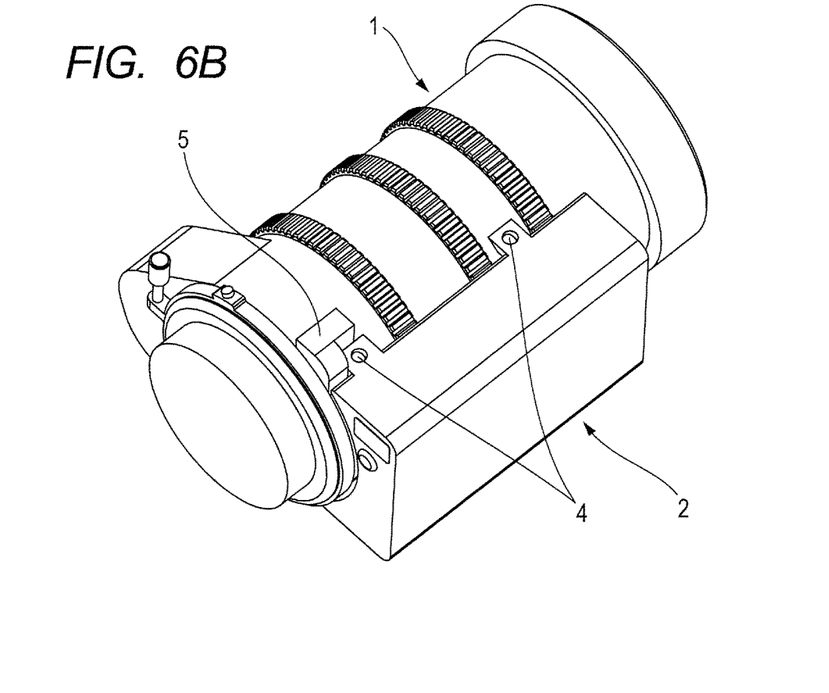
FIG. 6B is a perspective view illustrating the related-art structure establishing direct communication between the lens and the driving apparatus through the cable.

Further, in general, as the structure for establishing direct communication between the lens and the driving apparatus, there has been known such structure illustrated in FIGS. 6A and 6B that a lens 1 and a driving apparatus 2 are connected to each other through a cable 3. As illustrated in FIG. 6A, in this structure, the driving apparatus 2 is fixed to the lens 1 by threadingly fitting screws (not shown) into fastening units 4. Further, in order to establish information communication between the lens 1 and the driving apparatus 2, the driving apparatus 2 is connected to the lens 1 through the cable 3. When a user uses the lens apparatus, it is necessary to protect the cable 3 exposed to the outside, and hence a protecting member 5 illustrated in FIG. 6B is fixed to the lens 1 with screws (not shown). Therefore, in order to dismount the driving apparatus 2 fixed to the lens 1, the screws (not shown) that fix the protecting member 5 are unfastened, and then the cable 3 is disconnected from the lens 1. Subsequently, the screws (not shown) fitted into the fastening units 4 are unfastened. Thus, the driving apparatus 2 can be dismounted from the lens 1. However, in a case of this structure, there are a large number of processes of mounting and dismounting the driving apparatus 2, and there is a risk of breaking of a wire when disconnecting the cable 3. Accordingly, a user cannot easily mount and dismount the driving apparatus 2.

Figure 7:
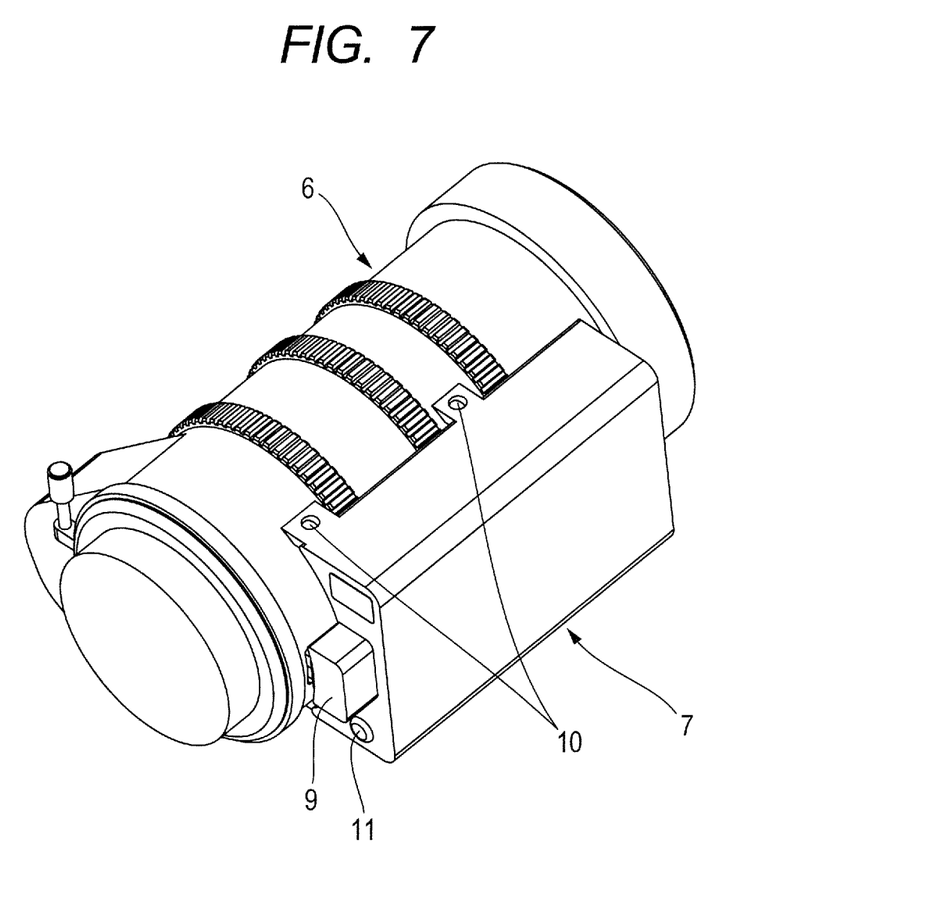
FIG. 7 is a perspective view illustrating the related-art structure establishing direct communication between the lens and the driving apparatus through contacts.
Figure 8A:
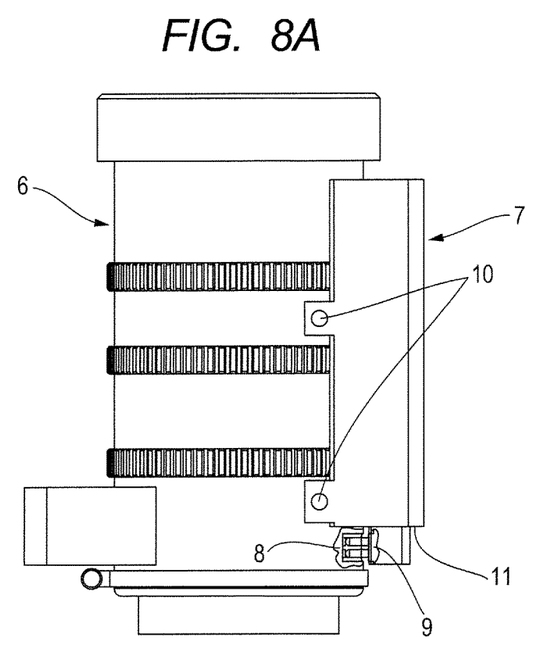
FIG. 8A is a detailed view illustrating the related-art structure establishing direct communication between the lens and the driving apparatus through the contacts.
Figure 8B:
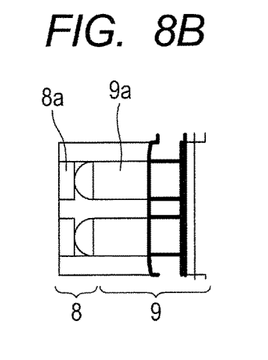
FIG. 8B is a detailed view illustrating the related-art structure establishing direct communication between the lens and the driving apparatus through the contacts.
Figure 9:
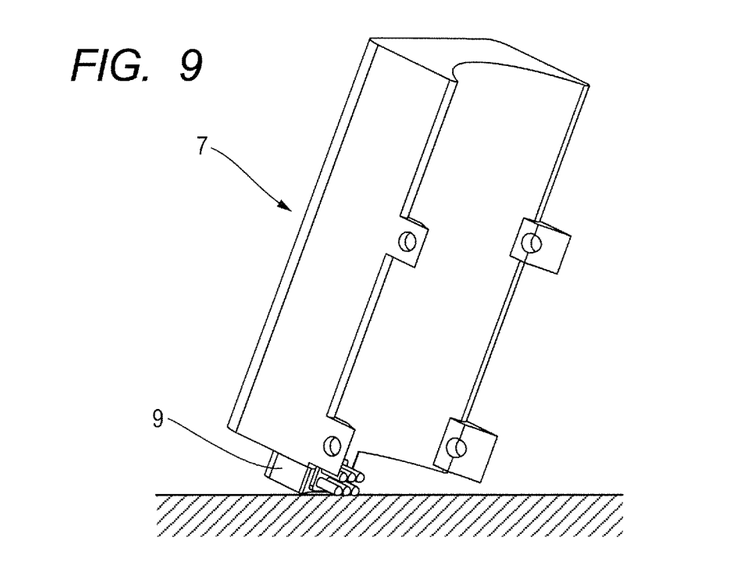
FIG. 9 is a view illustrating a state in which the driving apparatus of the related-art lens apparatus is dropped, to thereby receive an impact.

Accordingly, as structure for establishing direct communication between the lens 1 and the driving apparatus 2 without using the cable 3, such structure illustrated in FIGS. 7, 8A, and 8B can be exemplified that communication between a lens 6 and a driving apparatus 7 is established through contacts 8a, 9a. In this structure, the driving apparatus 7 is fixed to the lens 6 by threadingly fitting screws (not shown) into fastening units 10. Further, in order to establish direct communication between the lens 6 and the driving apparatus 7, communication units 8, 9 are provided. As illustrated in FIG. 8B, the communication units 8, 9 can provide information communication and power supply to the driving apparatus in such a manner that the contacts 8a on the lens 6 side and the contacts 9a on the driving apparatus 7 side are brought into contact with each other. In addition, when a user dismounts the driving apparatus 7 from the lens 6, the user unfastens the screws (not shown) fitted into the fastening units 10, to thereby be able to easily dismount the driving apparatus 7 from the lens 6. However, in a case where the driving apparatus 7 has the above-mentioned structure, when a user drops the driving apparatus 7 in a solitary use state as illustrated in FIG. 9, the communication unit 9 is liable to locally undergo application of load, which is disadvantageous for impact resistance. Further, in general, when a user takes an image, the driving apparatus 7 is supported by his/her hand, and a surface of an operation unit 11 is operated by a thumb. In this situation, in a case where the communication unit 9 is arranged on the surface of the operation unit 11 so as to be exposed, the thumb of the user hits against the exposed part at the time of operation, thereby deteriorating operability. In addition, the driving apparatus 7 has structure reduced in a shielding property, a static electricity resistance property, a dustproof property, and a dripproof property.

SUMMARY OF THE INVENTION

It is therefore an object of the present invention to provide a lens apparatus, which allows a user to easily mount and dismount a driving apparatus to and from a lens, and has mounting and dismounting structure between the lens and the driving apparatus in view of impact resistance, operability, a shielding property, an static electricity resistance property, a dustproof property, and a dripproof property, and to provide an image pickup apparatus including the lens apparatus. In order to achieve the above-mentioned object, according to one embodiment of the present invention, there is provided a lens apparatus, including: a lens barrel comprising an operation ring that is rotatable about an optical axis of an optical system to operate a movable optical member included in the optical system; and a driving apparatus that engages with the operation ring to drive the operation ring in a mounted state on the lens barrel, wherein the driving apparatus includes a first communication unit and an operation unit, wherein the lens barrel includes a second communication unit, wherein a communication between the lens barrel and the driving apparatus is established through the first communication unit and the second communication unit, wherein in the mounted state, the first communication unit is disposed on a surface covering a part of an outer peripheral surface of the lens barrel, and is located on a object side with respect to an operation unit that is arranged closest to an image side in an optical axis direction of the optical system on the driving apparatus.

According to the one embodiment of the present invention, it is possible to provide the lens apparatus, which allows the user to easily mount and dismount the driving apparatus to and from the lens barrel, and can be increased in impact resistance, operability, shielding property, static electricity resistance property, dustproof property, and dripproof property, and to provide the image pickup apparatus including the lens apparatus.

Further features of the present invention will become apparent from the following description of exemplary embodiments with reference to the attached drawings.

DESCRIPTION OF THE EMBODIMENTS

Now, exemplary embodiments of the present invention are described in detail with reference to the accompanying drawings.

First Embodiment

Figure 1:
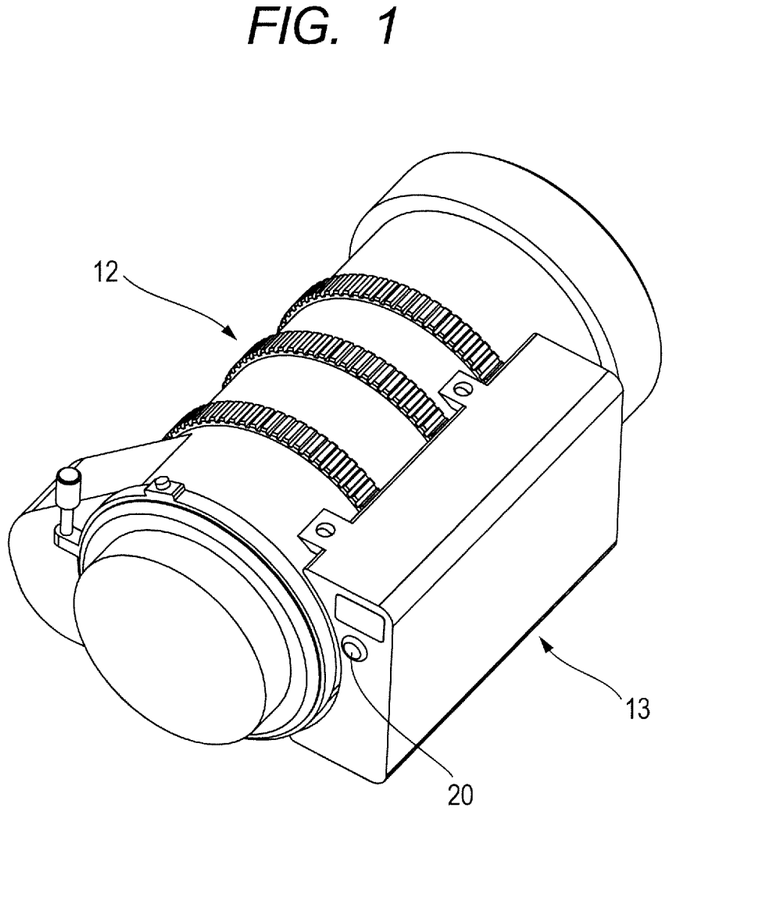
FIG. 1 is a perspective view illustrating a lens apparatus according to a first embodiment of the present invention.
Figure 2A:
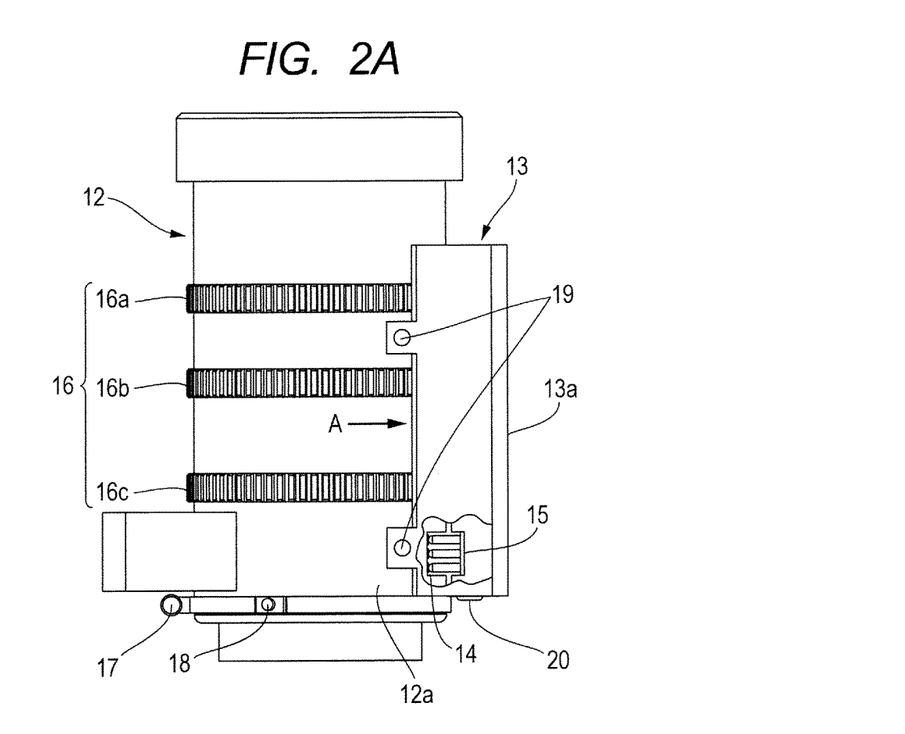
FIG. 2A is a detailed view illustrating the lens apparatus according to the first embodiment of the present invention.
Figure 2B:
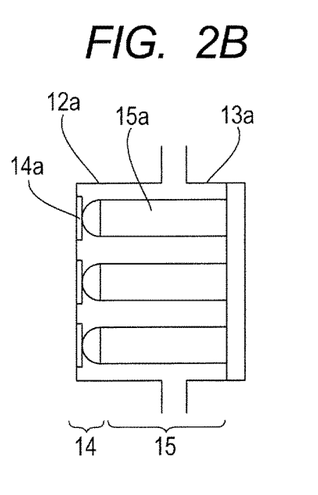
FIG. 2B is a detailed view illustrating the lens apparatus according to the first embodiment of the present invention.
Figure 2C:
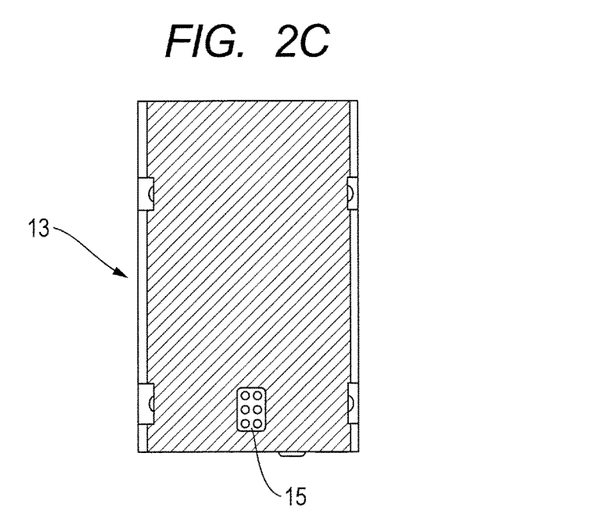
FIG. 2C is a detailed view illustrating the lens apparatus according to the first embodiment of the present invention.
Figure 3:
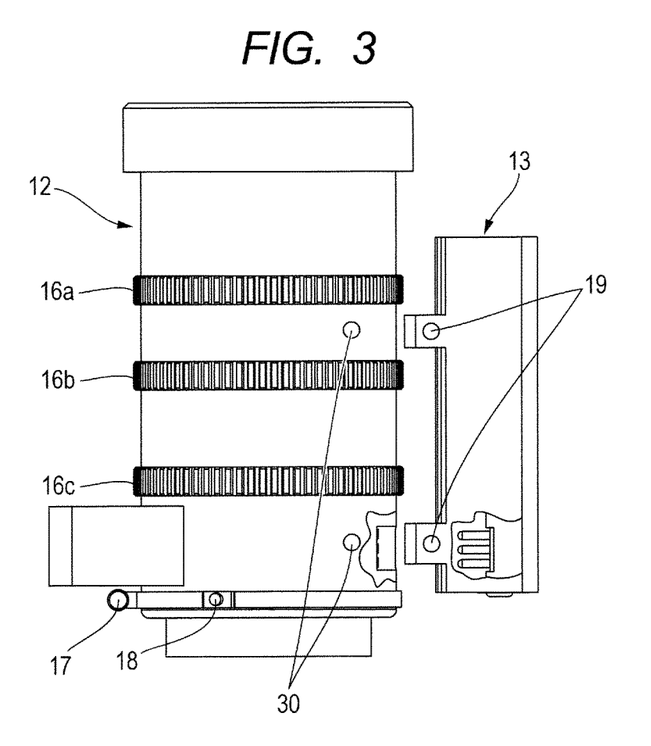
FIG. 3 is a view illustrating a mounting and dismounting state of mounting and dismounting structure between a lens and a driving apparatus of the lens apparatus according to the first embodiment of the present invention.
Figure 4A:
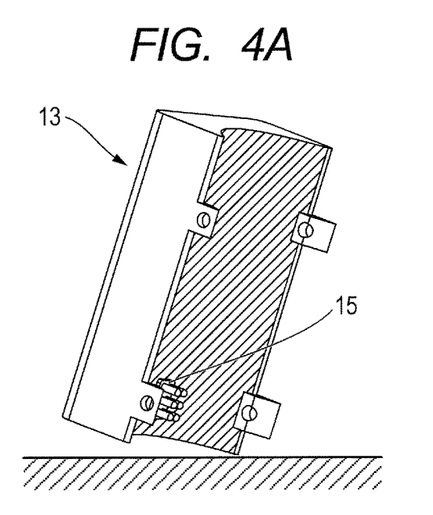
FIG. 4A is a view illustrating a state in which the driving apparatus of the lens apparatus according to the first embodiment of the present invention is dropped, to thereby receive an impact.
Figure 4B:
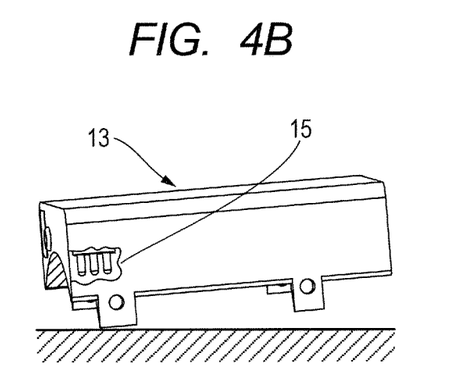
FIG. 4B is a view illustrating a state in which the driving apparatus of the lens apparatus according to the first embodiment of the present invention is dropped, to thereby receive an impact.

FIG. 1 is a perspective view illustrating mounting and dismounting structure between a lens and a driving apparatus of a lens apparatus according to a first embodiment of the present invention. FIGS. 2A, 2B, and 2C are detailed views illustrating the mounting and dismounting structure between the lens and the driving apparatus of the lens apparatus according to the first embodiment of the present invention. Further, FIG. 3 is a view illustrating a mounting and dismounting state of the mounting and dismounting structure between the lens and the driving apparatus of the lens apparatus according to the first embodiment of the present invention. FIGS. 4A and 4B are views illustrating a state in which the driving apparatus of the lens apparatus according to the first embodiment of the present invention is dropped, to thereby receive an impact.

With reference to FIGS. 1, 2A, 2B, and 2C, an outline of the lens apparatus is described.

The mounting and dismounting structure between the lens and the driving apparatus according to this embodiment includes a lens barrel 12, a driving apparatus 13 mounted to the lens barrel 12 in a dismountable manner and configured to drive the lens barrel 12, and communication units 14, 15 (a second communication unit 14, a first communication unit 15) respectively including contacts 14a, 15a configured to establish communication between the lens barrel 12 and the driving apparatus 13. The lens barrel 12 has the following structure. Specifically, a focus operation ring 16a is turned about an optical axis of an optical system so as to move (to operate) a focus lens unit (movable optical member included in the optical system) (not shown) in the optical axis direction. Thus, focus adjustment is performed. A zoom operation ring 16b is turned about the optical axis so as to move (to operate) a zoom lens unit (movable optical member included in the optical system) (not shown) in the optical axis. Thus, zoom adjustment is performed. Further, an iris operation ring 16c is turned about the optical axis so as to change (to operate) an aperture diameter of an aperture stop (movable optical member included in the optical system). Thus, light amount can be adjusted. Further, a flange back operation ring 17 or a macro operation ring 18 is turned so as to move a moving lens unit (not shown) in the optical axis direction. Thus, an in-focus distance to an image pickup element is adjusted.

Screws (not shown) inserted into fastening units are threadingly fitted into screw holes 30 (FIG. 3) formed in corresponding positions of an outer peripheral surface of the lens barrel 12, to thereby fix the driving apparatus 13 to the lens barrel 12. In addition, the driving apparatus 13 includes driving motors (not shown) configured to drive the respective operation rings 16, and position detecting units (not shown) configured to detect rotational positions of the respective operation rings 16. The driving motors are connected to gears (not shown), respectively. The gears are exposed from the driving apparatus 13. When the driving apparatus 13 is connected to the lens barrel 12, the gears are engaged with the respective operation rings 16 of the lens barrel 12. An operation unit 20 including various types of switches is arranged on an external portion of the driving apparatus 13. The operation unit 20 is operated so as to drive the internal motors, thereby being capable of rotating and driving the respective operation rings 16.

Next, the communication units 14, 15 (the second communication unit 14, the first communication unit 15) are described.

The lens barrel 12 and the driving apparatus 13 transfer an electric signal or electric power therebetween through the communication units 14, 15. The second communication unit 14 on the lens barrel 12 side is arranged on a object side with respect to the flange back operation ring 17 and the macro operation ring 18 that are arranged closest to an image side in the optical axis direction among the operation rings, and the second communication unit 14 is arranged on the image side with respect to the iris operation ring 16c that is arranged second closest to the image side. Further, the second communication unit 14 is arranged so as to protrude from an external surface of the lens barrel 12 to a side of connection with the driving apparatus 13. The first communication unit 15 of the driving apparatus 13 is arranged on the object side with respect to the operation unit 20 that is arranged closest to the image side in the optical axis direction on the driving apparatus 13, and the first communication unit 15 is arranged so as to overlap, along the optical axis direction, an arrangement range of the plurality of fastening units 19 (a first fastening unit disposed on a most image side, a second fastening unit disposed on a most object side) for fastening the driving apparatus 13 to the lens barrel 12. Further, as illustrated in FIG. 2C, which is a view as viewed from the arrow "A" direction of FIG. 2A, the first communication unit 15 is arranged on an inner peripheral surface (illustrated by hatching, i.e., a surface that faces the lens barrel 12 when the driving apparatus 13 is connected to the lens barrel 12) of the driving apparatus 13, and protrudes to the lens barrel 12 side. In other words, regarding positions of the communication units 14, 15 in the optical axis direction, in a state in which the lens barrel 12 and the driving apparatus 13 are connected to each other, the communication units 14, 15 are arranged so that the respective contacts are positioned in a region where the driving apparatus 13 covers a part of the outer peripheral surface of the lens barrel 12. FIG. 2B illustrates states of the communication units 14, 15 when the driving apparatus 13 is fixed to the lens barrel 12. As illustrated in FIG. 2B, when the contacts 14a on the lens barrel 12 side and the contacts 15a on the driving apparatus 13 side are brought into contact with each other, information communication can be established between the lens barrel 12 and the driving apparatus 13, and power can be supplied from the lens barrel 12 to the driving apparatus 13. Further, the communication units 14, 15 in fixed states are shielded by a casing 12a of the lens barrel 12 and a casing 13a of the driving apparatus 13.

The above description describes a configuration of the lens apparatus according to this embodiment.

Next, description is made of a method of dismounting the driving apparatus 13 from the lens barrel 12. As illustrated in FIG. 3, the screws (not shown) that fasten the fastening units 19 to the lens barrel 12 are unfastened so as to unfix the driving apparatus 13 from the lens barrel 12. Subsequently, the lens barrel 12 and the driving apparatus 13 are separated from each other in separate directions. Thus, engaging portions between the gears of the driving motors and the respective operation rings 16 are separated from each other, and the contacts of the communication units 14, 15 for establishing information communication and supplying power are separated from each other, thereby disconnecting the lens barrel 12 and the driving apparatus 13 from each other. In this manner, as illustrated in FIG. 3, the driving apparatus 13 is independent of the lens barrel 12. When mounting the driving apparatus 13 to the lens barrel 12, mounting can be performed in reverse procedures. Therefore, a mounting and dismounting process is simple, and hence a user can easily mount and dismount the driving apparatus 13 to and from the lens barrel 12. In addition, the lens apparatus has structure in which no cable is used for the communication units 14, 15, and hence involves no breaking of a wire at the time of mounting and dismounting. That is, the communication units are formed so as to have contact structure, thereby being capable of obtaining easiness at the time of mounting and dismounting and reliability of the communication units.

In the lens apparatus according to the present invention, in a connected state (in a mounted state on the lens barrel), a position of the first communication unit 15 in the optical axis direction is arranged on the object side with respect to the operation unit 20 on the image pickup element side. Moreover, the position of the first communication unit 15 in the optical axis direction is arranged so as to overlap the arrangement range of the plurality of fastening units 19 that are arranged apart from each other in the optical axis direction. Further, the first communication unit 15 is arranged on the inner peripheral surface (illustrated by hatching, i.e., a surface that faces the lens barrel 12 when the driving apparatus 13 is connected to the lens barrel 12, or a recessed surface portion on the driving apparatus 13 side) of the driving apparatus 13 when the lens barrel 12 and the driving apparatus 13 are connected to each other. An effect of the present invention obtained with this configuration is described with reference to FIGS. 2A, 2B, 2C, 4A, and 4B. Even when a user drops the driving apparatus 13 in a solitary state as illustrated in FIG. 4A, the position of the first communication unit 15 in the optical axis direction is arranged on the object side with respect to the operation unit 20 arranged closest to the image pickup element side when the driving apparatus 13 is connected to the lens barrel 12, and is arranged so as to overlap the arrangement range of the plurality fastening units 19 arranged apart from each other in the optical axis direction. Accordingly, the driving apparatus 13 has such arrangement structure that load is not locally applied to the first communication unit 15. In addition, even when a user drops the driving apparatus 13 as illustrated in FIG. 4B, the first communication unit 15 is arranged on the inner peripheral surface (illustrated by hatching, i.e., a surface that faces the lens barrel 12 when the driving apparatus 13 is connected to the lens barrel 12, or a recessed surface portion on the driving apparatus 13 side) of the driving apparatus 13, and hence the driving apparatus 13 has arrangement structure that is less likely to undergo local application of load to the first communication unit 15, which is advantageous for impact resistance. Further, the position of the first communication unit 15 on the driving apparatus 13 side in the optical axis direction is arranged so as to overlap the arrangement range of the plurality of fastening units 19 arranged apart from each other in the optical axis direction, and hence the contacts 14a, 15a are pressed most reliably, thereby achieving structure in which the contacts are not easily separated from each other during use. In addition, with this structure, the first communication unit is positioned so as to overlap the arrangement range of the plurality of fastening units 19 arranged apart from each other in the optical axis direction, and hence "prying" at positions of the contacts, which may occur for fine adjustment between mutual positions of the contacts when the lens barrel 12 and the driving apparatus 13 are fastened and connected to each other, is less subjected to a moment, thereby reducing a risk of damaging the contacts. Further, as illustrated in FIGS. 1, 2A, 2B, and 2C, the first communication unit 15 is structured to be accommodated inside the driving apparatus 13 without protruding from a surface of the operation unit 20. Accordingly, when a user operates the operation unit 20, the first communication unit 15 does not cause interference, which increases operability. In addition, the communication units 14, 15 are covered by the casing 12a of the lens barrel 12 and the casing 13a of the driving apparatus 13, thereby increasing a shielding property, a static electricity resistance property, a dustproof property, and a dripproof property.

Next, with reference to FIGS. 2A, 2B, and 2C, description is made of an effect obtained in such a manner that the position of the second communication unit 14 on the lens barrel 12 side in the optical axis direction is arranged on the image pickup element side with respect to the iris operation ring 16c. In a case where the second communication unit 14 is arranged on the object side with respect to the iris operation ring 16c, in general, access to the second communication unit 14 is established through wires (not shown) passing through an inside of the lens barrel 12. Accordingly, when the respective operation rings 16 are turned, it is necessary to cut out a part of each operation ring 16 so as to prevent interference of the wires. In addition, grease on a sliding portion (not shown) of each operation ring 16 may spatter through a cutout portion (not shown). However, in a case where the position of the second communication unit 14 in the optical axis direction is arranged on the image pickup element side with respect to the iris operation ring 16c as in the case of the structure according to the present invention, it is unnecessary to cut out the respective operation rings 16, and hence grease does not spatter, thereby increasing quality of the lens.

Second Embodiment

Figure 5A:
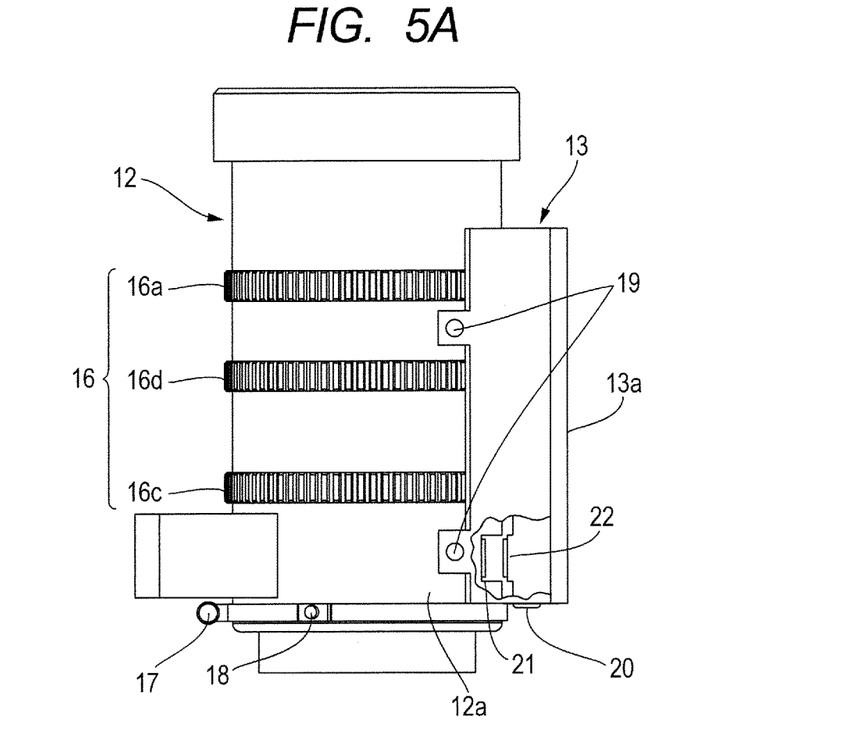
FIG. 5A is a detailed view illustrating a lens apparatus according to a second embodiment of the present invention.
Figure 5B:
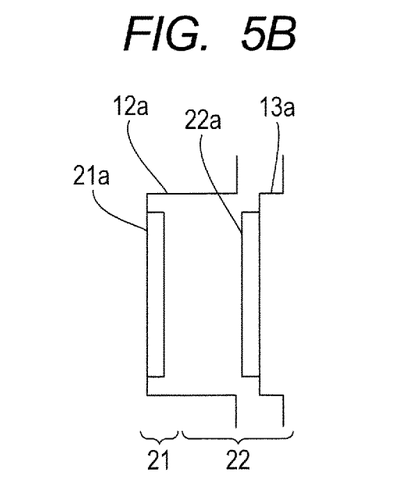
FIG. 5B is a detailed view illustrating the lens apparatus according to the second embodiment of the present invention.

FIGS. 5A and 5B are detailed views illustrating mounting and dismounting structure between a lens and a driving apparatus according to a second embodiment of the present invention. This embodiment differs from the first embodiment in that, instead of the communication units 14, 15, communication units 21, 22 (the second communication unit 21, the first communication unit 22) are used. The communication units 21, 22 have structure that employs sensors 21a, 22a having non-contact structure. The other components are the same as those of the first embodiment. In the following, only different parts from the first embodiment are described. The same components are denoted by the same reference symbols, and description thereof is omitted.

The communication units 21, 22 are described with reference to FIGS. 5A and 5B. FIG. 5B illustrates states of the communication units 21, 22 when the driving apparatus 13 is fixed to the lens barrel 12. The sensor 21a on the lens barrel 12 side and the sensor 22a on the driving apparatus 13 side are arranged so as to be opposed to each other. Thus, mutual information communication between the lens barrel 12 and the driving apparatus 13 can be established, and power can be supplied to the driving apparatus 13.

The above-mentioned configuration can provide information communication and power supply in a non-contact manner in addition to the effect obtained in the first embodiment, thereby increasing abrasion resistance of the communication units. In addition, the above-mentioned configuration increases the dripproof property as compared to the contact structure, and has no risk of electrical short circuit even when a foreign matter is present between the communication units.

For example, in this embodiment, the position of the communication unit of the driving apparatus (the first communication unit) in the optical axis direction is arranged so as to overlap one of the fastening units, but may be arranged between the fastening units. Further, in this embodiment, the communication units can provide both information communication and power supply, but may provide only information communication. Further, in this embodiment, the contact structure and the non-contact structure are employed independently, but the contact structure and the non-contact structure may be employed in combination.

Further, an image pickup apparatus, which includes the lens apparatus according to the above-mentioned exemplary embodiments, and a camera apparatus including an image pickup element configured to receive object light emitted from the lens apparatus, can realize an image pickup apparatus capable of attaining the effect of the lens apparatus according to the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-078070, filed Apr. 4, 2014, which is hereby incorporated by reference herein in its entirety.

What is claimed is:

1. A lens apparatus comprising:
   a lens barrel including a first operation ring, a second operation ring, and a third operation ring that are spaced apart along an optical axis direction of an optical system and disposed in this order from an object side toward an image side, each of the first, second, and third operation rings being rotatable about an optical axis of the optical system to operate a movable optical member included in the optical system; and
   a driving apparatus that engages with the first, second, and third operation rings to drive the first, second, and third operation rings in a mounted state on the lens barrel,
   wherein the driving apparatus includes a first communication unit and at least one operation unit,
   wherein the lens barrel includes a second communication unit,
   wherein communication between the lens barrel and the driving apparatus is established through the first communication unit and the second communication unit,
   wherein in the mounted state, the lens barrel and the driving apparatus are fastened to each other using a first fastener and a second fastener disposed spaced apart from each other in the optical axis direction,
   wherein at least part of the first communication unit is disposed overlapping the first fastener in the optical axis direction,
   wherein in the mounted state, the second fastener is disposed between first and second operation rings in the optical axis direction,
   wherein the second communication unit is disposed spaced from the third operation ring in the optical axis direction and disposed closer to the image side than the third operation ring in the optical axis direction, and
   wherein the first fastener is disposed spaced from the third operation ring toward the image side in the optical axis direction.

2. The lens apparatus according to claim 1, wherein:
   the movable optical member is an aperture stop,
   the third operation ring is an iris operation ring that is operated to change an aperture diameter of the aperture stop, and
   in the mounted state, the second communication unit is disposed on the image side with respect to the iris operation ring in the lens barrel.

3. The lens apparatus according to claim 1, wherein:
the movable optical member is a focus lens unit,
the first operation ring is a focus operation ring that is operated to drive the focus lens unit in the optical axis direction, and
in the mounted state, the second communication unit is disposed on the image side with respect to the focus operation ring in the lens barrel.

4. The lens apparatus according to claim 1, wherein:
the movable optical member is a zoom lens unit,
the second operation ring is a zoom operation ring that is operated to move the zoom lens unit in the optical axis direction, and
in the mounted state, the second communication unit is disposed on the image side with respect to the zoom operation ring in the lens barrel.

5. The lens apparatus according to claim 1, wherein the first and second communication units are contact type communication units.

6. The lens apparatus according to claim 1, wherein the first and second communication units are non-contact type communication units.

7. An image pickup apparatus comprising:
a lens apparatus; and
an image pickup element configured to receive light emitted from the lens apparatus,
wherein the lens apparatus comprises:
  a lens barrel including a first operation ring, a second operation ring, and a third operation ring that are spaced apart along an optical axis direction of an optical system and disposed in this order from an object side toward an image side, each of the first, second, and third operation rings being rotatable about an optical axis of the optical system to operate a movable optical member included in the optical system; and
  a driving apparatus that engages with the first, second, and third operation rings to drive the first, second, and third operation rings in a mounted state on the lens barrel,
  wherein the driving apparatus includes a first communication unit and at least one operation unit,
  wherein the lens barrel includes a second communication unit,
  wherein communication between the lens barrel and the driving apparatus is established through the first communication unit and the second communication unit,
  wherein in the mounted state, the lens barrel and the driving apparatus are fastened to each other using a first fastener and a second fastener disposed spaced apart from each other in the optical axis direction,
  wherein at least part of the first communication unit is disposed overlapping the first fastener in the optical axis direction,
  wherein in the mounted state, the second fastener is disposed between first and second operation rings in the optical axis direction,
  wherein the second communication unit is disposed spaced from the third operation ring in the optical axis direction and disposed closer to the image side than the third operation ring in the optical axis direction, and
  wherein the first fastener is disposed spaced from the third operation ring toward the image side in the optical axis direction.

8. A lens apparatus comprising:
a lens barrel including a plurality of operation rings, each of which is rotatable about an optical axis of an optical system to operate a movable optical member included in the optical system; and
a driving apparatus that engages with the plurality of operation rings to electrically drive the plurality of operation rings in a mounted state on the lens barrel,
wherein the driving apparatus includes a first communication unit and at least one operation unit,
wherein the lens barrel includes a second communication unit,
wherein communication between the lens barrel and the driving apparatus is established through the first communication unit and the second communication unit,
wherein in the mounted state, the lens barrel and the driving apparatus are fastened to each other using a first fastener and a second fastener disposed spaced apart from each other in the optical axis direction,
wherein in the mounted state, at least one first operation ring, among the plurality of operation rings, is disposed on the object side of the second fastener in the optical axis direction of the optical system,
wherein in the mounted state, at least one second operation ring, among the plurality of operation rings, other than the at least one first operation ring, is disposed between the first fastener and the second fastener in the optical axis direction of the optical system, and
wherein at least part of the first communication unit is disposed overlapping the first fastener in the optical axis direction of the optical system.

9. A driving apparatus engaged with an operating ring and configured to drive the operating ring in a mounted state where the driving apparatus is mounted on a lens barrel having the operating ring rotatable about an optical axis of the lens barrel to operate a movable optical element included in the lens barrel, the driving apparatus comprising:
a first communication unit that communicates with the lens barrel; and
an operating unit configured to be operable to drive the operating ring,
wherein the lens barrel and the driving apparatus are fastened to each other with a plurality of fasteners disposed apart from each other in a direction of the optical axis in the mounted state,
wherein the first communication unit is disposed at a position where the first communication unit does not protrude from the operating unit in the direction of the optical axis, and
wherein at least part of the first communication unit is disposed to overlap one of the plurality of fasteners in the direction of the optical axis.

10. A lens apparatus comprising:
the driving apparatus according to claim 9; and
the lens barrel,
wherein the lens barrel has a second communication unit, and
wherein a communication between the lens barrel and the driving apparatus is carried out through the first communication unit and the second communication unit.

11. An image pickup apparatus comprising:
an image pickup element; and
the lens apparatus according to claim 10,
wherein the lens apparatus directs light to the image pickup element.

* * * * *